United States Patent
Maruoka

[11] 3,778,040
[45] Dec. 11, 1973

[54] FUEL SUPPLY CONTROL DEVICE
[75] Inventor: Hiroyuki Maruoka, Yokohama, Japan
[73] Assignee: Nissan Motor Company, Limited, Yokohama City, Japan
[22] Filed: Sept. 23, 1971
[21] Appl. No.: 183,111

[30] Foreign Application Priority Data
Nov. 17, 1970 Japan.............................. 45/101218

[52] U.S. Cl............ 261/36 A, 123/32 AE, 222/55, 222/318, 261/51
[51] Int. Cl............................................. G05b 1/01
[58] Field of Search ................. 222/55, 59, 76, 318, 222/424, 330, 331, 291; 239/124, 126; 123/32 AE, 139 E; 261/36 A, 39 R, 51

[56] References Cited
UNITED STATES PATENTS
3,329,411   7/1967   Offner................................ 261/39 R
2,889,117   6/1959   Wimpress.......................... 239/124
3,147,767   9/1964   Goss................................ 222/318 X FOREIGN PATENTS OR APPLICATIONS
1,148,913   3/1956   France................................. 222/55
  568,456   1/1959   Canada.............................. 239/126

Primary Examiner—Robert B. Reeves
Assistant Examiner—James M. Slattery
Attorney—John Lezdey

[57] ABSTRACT

A device for controlling the amount of liquid fuel to be supplied to a desired device and having a source of liquid fuel, comprising a fuel supply control unit including first and second nozzles and a pressure chamber, the degree of throttling of the second nozzle being varied by a valve member the movement of which is controlled by a torque motor, whereby a pressure prevailing in the pressure chamber is varied thereby to control the amount of liquid fuel discharged from the first nozzle.

5 Claims, 3 Drawing Figures

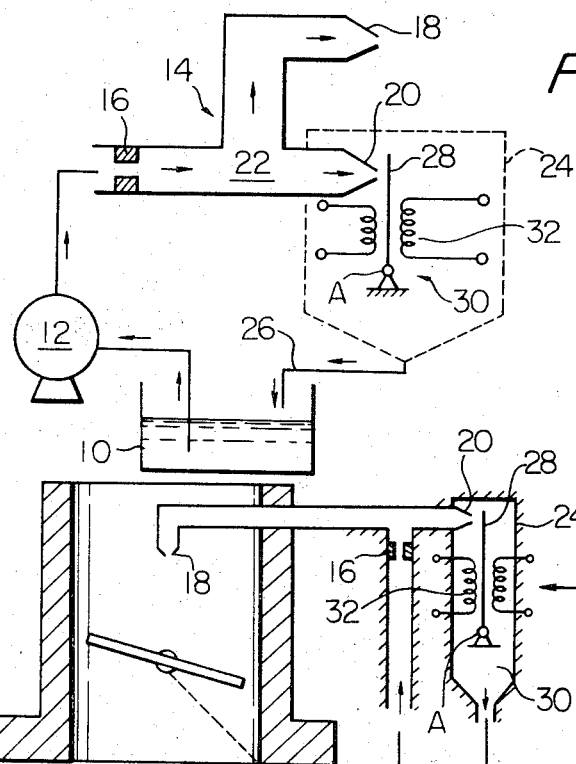
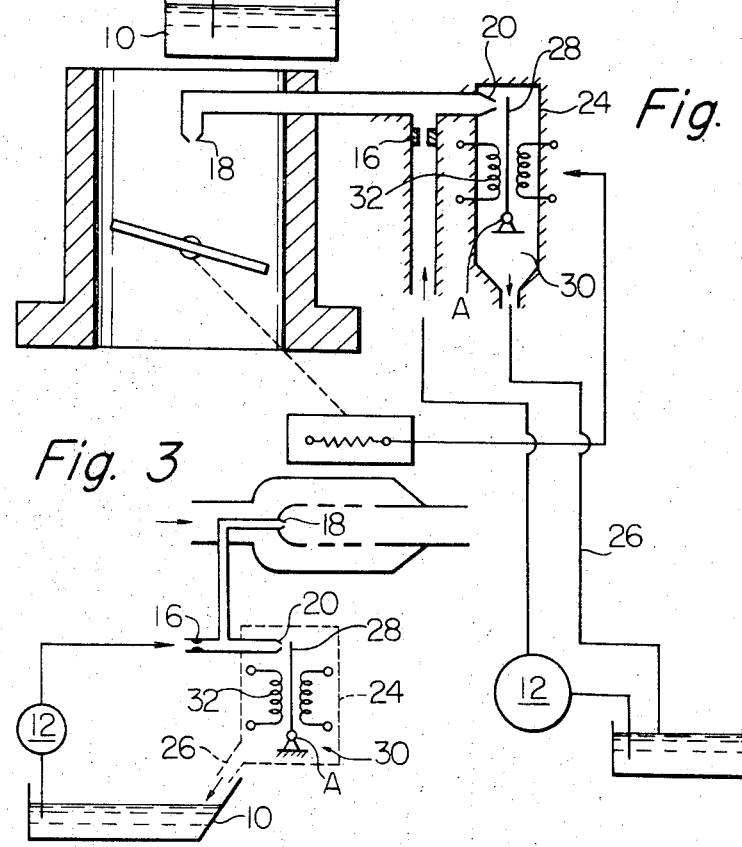
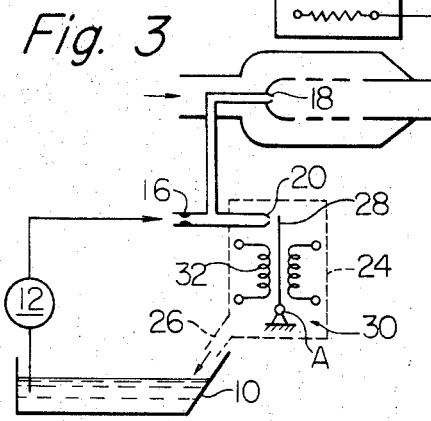
INVENTOR
HIROYUKI MARUOKA
BY John Legally
ATTORNEY

FUEL SUPPLY CONTROL DEVICE

This invention relates to fuel supply control devices and, more particularly, to such a control device characterized by a novel arrangement for controlling the amount of liquid fuel to be supplied to a desired apparatus.

The fuel supply control device according to this invention is specifically suited for use in apparatuses including, for example, a carburetor of an internal combustion engine or an after-burner associated with an exhaust system of a motor vehicle, each of which needs to continuously vary the amount of liquid fuel to meet varying conditions of the motor vehicle. The principal object of this invention is, therefore, to provide a fuel supply control device for continuously varying the amount of liquid fuel to be supplied to a desired apparatus in a reliable manner in accordance with a given variable.

Accordingly, the present invention contemplates to provide in a fuel supply control device a fuel supply control unit having therein an orifice for restricting the flow of liquid fuel to be delivered from a source of liquid fuel. The fuel supply control unit includes first and second nozzles and a pressure chamber intervening between the orifice and first and second nozzles. A valve member is positioned to be opposite to the opening end of the second nozzle for varying the degree of opening of the second nozzle. A torque motor is disposed for controlling the movement of the valve member in accordance with a given variable for varying the degree of throttling of the second nozzle to vary the pressure in the pressure chamber for thereby varying the amount of liquid fuel discharged from the first nozzle.

In the accompanying drawings:

FIG. 1 is a schematic view of a fuel supply control device according to this invention;

FIG. 2 is an example of application of the fuel supply control device shown in FIG. 1, the control device being shown as incorporated in a carburetor of an internal combustion engine; and FIG. 3 is another example of application of the fuel supply control device shown in FIG. 1, the fuel supply control device being shown as incorporated in an afterburner of a motor vehicle.

Referring now to FIG. 1, there is schematically shown a fuel supply control device implementing this invention. The fuel supply control device includes a fuel reservoir 10 charged with a liquid fuel and a fluid pump 12 which draws the liquid fuel from the fuel reservoir 10. The fuel reservoir 10 and the fluid pump 12 serve as a source of liquid fuel. The fluid pump 12 is connected to a fuel supply control unit 14 which has a flow restriction such as an orifice 16. The orifice 16 restricts the flow of liquid fuel delivered from the source of liquid fuel. The fuel supply control unit 14 includes a first nozzle 18, a second nozzle 20, and a pressure chamber 22 intervening between the orifice 16 and first and second nozzles 18 and 20. The orifice 16 is sized to be larger in effective cross sectional area than that of the sum of the cross-sectional areas of the first and second nozzles 18 and 20. The end of the first nozzle 18 is constantly open to the interior of the desired apparatus such as the engine carburetor while the end of the other nozzle 20 is open to the interior of a drain chamber 24. The drain chamber 24 is provided with a conduit 26 for allowing the liquid fuel discharged from the second nozzle 20 to pass into the fuel reservoir 10.

As shown in FIG. 1, the fuel supply control device also includes a valve member 28 which is pivoted at a point A and which is positioned to be opposite to the end of the second nozzle 20. A torque motor 30 is provided for actuating the valve member 28 so that the flapper 28 may control the degree of throttling of the second nozzle 20. The torque motor 30 includes an energizing coil 32 within which the valve member 28 is operatively disposed. The movement of the valve member 28 and accordingly the degree of throttling of the second nozzle 20 are determined by the amount of electric current with which the energizing coil 32 is energized. The energizing coil 32 is arranged in such a manner that, when sufficiently energized, the valve member 28 is caused to rotate counterclockwise about the pivot A by the torque exerted thereon to close the end of the second nozzle 20 so that the pressure in the pressure chamber 22 is increased thereby to increase the amount of liquid fuel discharged from the first nozzle. It will thus be seen that the amount of liquid fuel to be discharged from the first nozzle 18 varies in accordance with the amount of electric current applied to the energizing coil 32.

In considering the operation of the fuel supply control device according to this invention, let it be assumed that the energizing coil 32 of the torque motor 30 is energized while the pressurized liquid fuel is flowing in the direction indicated by the arrows from the fuel reservoir 10 to the pressure chamber 22 of the fuel supply control unit 14. When, in this instance, the amount of electric current applied to the first coil 32 is increased the torque exerted on the flapper 28 increases to cause the valve member 28 to rotate counterclockwise about the pivot A until the valve member 28 contacts with the discharge end of the second nozzle 20. This causes the degree of throttling of the second nozzle 20 to increase thereby increasing the pressure in the pressure chamber 22. Consequently, the amount of liquid fuel discharged from the first nozzle 18 is increased. When, on the contrary, less electric current is supplied to the energizing coil 32, the torque produced by the coil 32 decreases so that the movement of the valve member 28 is decreased. Thus, the degree of throttling of the second nozzle 20 is decreased. As a result the pressure in the pressure chamber 22 is decreased and, therefore, the amount of liquid fuel discharging from the first nozzle is decreased.

If the energizing coil 32 is de-energized, no torque is produced thereby, so that the valve member 28 is caused to rotate clockwise about the pivot A by the pressure of the liquid fuel discharging from the second nozzle 20. Thus, the throttling of the second nozzle 20 is maintained at a maximum value and, therefore, the pressure in the pressure chamber 22 decreases. Accordingly, the first nozzle 18 discharges a minimum amount of liquid fuel therefrom. The liquid fuel discharged from the second nozzle 20 is delivered through the conduit 26 to the fuel reservoir 10. Thus, it will be apparent that the amount of liquid fuel discharged from the first nozzle 18 is progressively varied in accordance with the electric current applied to the energizing coil 32.

FIG. 2 illustrates an example of an application wherein the fuel supply control device is combined with a carburetor of an internal combustion engine. In this illustrated embodiment, the torque motor 30 is shown to be controlled as a function of, for example, an opening condition of the engine carburetor throttle valve. However, it should be noted that the amount of electric current energizing the torque motor 30 may be controlled in response to the position of an accelerator pedal (not shown), intake manifold vacuum or vehicle speed. By this application, the carburetor of the internal combustion engine is greatly improved in reliability and in performance.

Another example of application of the fuel supply control device is schematically shown in FIG. 3. As shown, the fuel supply control device is incorporated in an after-burner associated with an exhaust system (not shown) for effecting after-burning of engine exhaust gases thereby to reduce an air pollution.

What is claimed is:

1. A fuel supply control device comprising a source of liquid fuel, a flow restriction communicating with said source of liquid fuel for restricting the flow of liquid fuel delivered from said source of liquid fuel, first and second nozzles provided in parallel with respect to each other and communicating through said flow restriction with said source of liquid fuel, a pressure chamber formed between said flow restriction and said first and second nozzles, a drain chamber to which said second nozzle opens and communicating with said source of liquid fuel to permit the liquid fuel discharged from said second nozzle to return to said source of liquid fuel, a valve member pivotally supported in said drain chamber, said valve member being positioned to cooperate with said second nozzle for opening and closing same, and an electric actuating means mounted in said drain chamber, said electric actuating means being energizable to varying degrees to pivot said valve member proportionally to said varying degrees for thereby varying the degree of opening of said second nozzle to vary the pressure in said pressure chamber for thereby controlling the amount of liquid fuel discharged from said first nozzle.

2. A fuel supply control device according to claim 1, in which said flow restriction is larger in effective cross-sectional area than the sum of the cross-sectional areas of said first and second nozzles.

3. A fuel supply control device according to claim 1, in which said electric actuating means comprises a torque motor including an energizing coil for causing pivoting of said valve member to vary the opening of said second nozzle in accordance with the electrical energization of said energizing coil.

4. A fuel control device for an internal combustion engine having a carburetor provided with a throttle valve, comprising a source of liquid fuel, a flow restriction communicating with said source of liquid fuel for restricting the flow of liquid fuel delivered from said source of liquid fuel, first and second nozzles provided in parallel with respect to each other and communicating through said flow restriction with said source of liquid fuel, said first nozzle opening in to the carburetor of the engine, a pressure chamber formed between said flow restriction and said first and second nozzles, a drain chamber to which said second nozzle opens and communicating with said source of liquid fuel to permit the liquid fuel discharged from said second nozzle to return to said source of liquid fuel, a valve member pivotally supported in said drain chamber, said valve member being positioned to cooperate with said second nozzle for opening and closing same, and an electric actuating means mounted in said drain chamber, said electric actuating means being energizable to varying degrees to pivot said valve member proportionally to said varying degrees for thereby varying the degree of opening of said second nozzle to vary the pressure in said pressure chamber for thereby controlling the amount of liquid fuel discharged from said first nozzle, said electric actuating means having a torque motor controlled as a function of the degree of opening of said throttle valve, said torque motor including an energizing coil for causing pivoting of said valve member to vary the opening of said second nozzle in accordance with the electrical energization of said energizing coil.

5. A fuel supply control device according to claim 4, in which said flow restriction is larger in effective cross-sectional area than the sum of the cross-sectional areas of said first and second nozzles.

* * * * *